United States Patent
Strangman et al.

(10) Patent No.: US 6,541,134 B1
(45) Date of Patent: Apr. 1, 2003

(54) ABRADABLE THERMAL BARRIER COATING FOR CMC STRUCTURES

(75) Inventors: Thomas Edward Strangman, Phoenix, AZ (US); Chen-Wei Li, Livingston, NJ (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 109 days.

(21) Appl. No.: 09/599,426

(22) Filed: Jun. 22, 2000

(51) Int. Cl.[7] ............... B32B 9/00; F03B 3/12
(52) U.S. Cl. ............. 428/698; 428/697; 428/702; 428/408; 428/448; 428/323; 428/332; 416/241 B
(58) Field of Search ............... 428/323, 332, 428/448, 408, 697, 698, 702; 416/241 B

(56) References Cited

U.S. PATENT DOCUMENTS 5,305,726 A * 4/1994 Scharman et al.
5,863,668 A * 1/1999 Brindley et al.
6,159,553 A * 12/2000 Li et al.
6,254,974 B1 * 7/2001 Hansawa et al.
6,316,048 B1 * 11/2001 Steibel et al.

* cited by examiner

Primary Examiner—Deborah Jones
Assistant Examiner—Jennifer McNeil
(74) Attorney, Agent, or Firm—Thomas C. Stover

(57) ABSTRACT

A bond coating is applied between a ceramic matrix composite and a insulative and abradable top coat layer. The bond coating is a slurry layer of fine particles of silicon nitride and silicon carbide suspended in a colloidal silica or zircon binder. The ratio of these materials in the bond coating should match the ratio of these in the CMC. If the CMC is SiC fibers in a SiC matrix, the slurry should be composed of SiC particles with a colloidal silica binder. High surface roughness is achieved by entrapping coarse ceramic particles into the wet bond coating slurry. Thereafter the product is heat treated to maximize bond strength and verify oxidation resistance.

14 Claims, 1 Drawing Sheet

ABRADABLE THERMAL BARRIER COATING FOR CMC STRUCTURES

CROSS-REFERENCES TO RELATED PATENT APPLICATIONS

This patent application is related to U.S. patent application Ser. No. 09/208,109, filed Nov. 27, 1998 now U.S. Pat. No. 6,159,553.

STATEMENT REGARDING FEDERALLY SPONSORED RESEARCH OR DEVELOPMENT

The invention described herein may be manufactured and used by or for the Government for governmental purposes without the payment of any royalty thereon.

BACKGROUND OF THE INVENTION

The present invention relates to jet turbine engines and, in particular, relates to the static shrouds around the turbine blades and the blade-tip outer air seals.

Efforts to plasma spray thick abradable thermal barrier coating (TBC) systems to ceramic matrix composites (CMC) being developed for turbine shrouds (blade-tip outer air seals) has been inhibited by poor bonding to the silicon nitride substrate. Oxidation resistant CVD silicon nitride bon coatings, which were evaluated to enhance the oxidation resistance of cut SC fibers and the reaction bonded silicon nitride matrix, cracked extensively and locally spalled. Erratic thermal spray deposition of tantalum oxide and mullite coating was achieved with the use of grit blasted uncoated CMC and microcracked CVD SiC bond coated CMC substrates. However, successful dposition was only achieved when the CMC was preheated to above approximately 1000 degrees Centigrade. Severe oxidation of the CVD SiC bond coated CMC was observed during a 90 hour pre-coating furnace oxidation heat treatment at 1200 degrees Centigrade in air.

Thus, there exists a need for a better abradable TBC for CMCs.

BRIEF SUMMARY OF THE INVENTION

A bond coating is applied between a ceramic matrix composite and a insulative and abradable coating layer.

The bond coating is a slurry layer of fine particles of silicon nitride and silicon carbide suspended in a colloidal silica or zircon binder. The ratio of these materials in the bond coating should match the ratio of these in the CMC. If the CMC is SiC fibers in a SiC matrix, the slurry should be composed of SiC particles with a colloidal silica binder. High surface roughness is achieved by entrapping coarse ceramic particles into the wet bond coating slurry. Thereafter the product is heat treated to maximize bond strength and verify oxidation resistance.

Therefore, one object of the present invention is to provide an abradable thermal barrier coating (TBC) for turbine shrouds.

Another object of the present invention is to provide a TBC for using on silicon nitride substrates.

Another object of the present invention is to provide a TBC that are oxidation resistant.

Another-object of the present invention is to provide a TBC for the coating of ceramic matrix composites.

Another object of the present invention is to provide a TBC having good thermal expansion and oxidation resistance.

These and many other objects and advantages of the present invention will be ready apparent to one skilled in the pertinent art from the following detailed description of a preferred embodiment of the invention and the related drawings.

BRIEF DESCRIPTION OF THE SEVERAL VIEWS OF THE DRAWINGS

The only Figure is that a thermal barrier coating for a SiC-fiber/silicon nitride-matrix CMC composite.

DETAILED DESCRIPTION OF THE INVENTION

Figure 1:
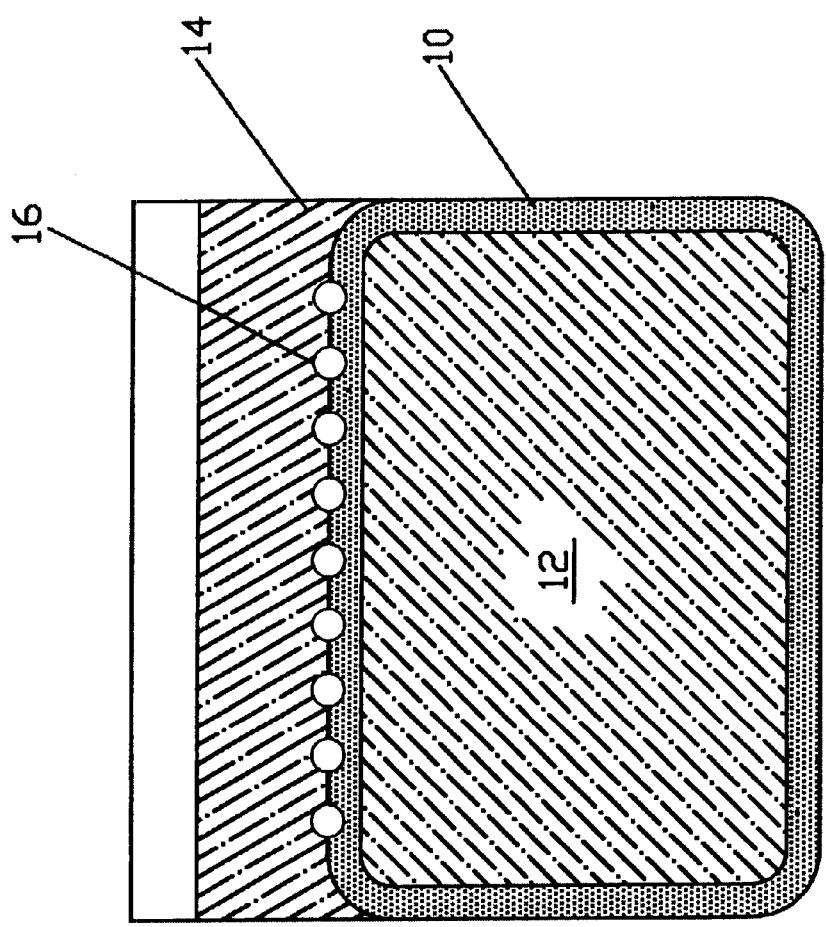

Referring to the only Figure, a bond coating 10 is applied between a ceramic matrix composite substrate 12 and an insulative and abradable top coating layer 14. The bond coating 10 is a slurry layer of fine particles (e.g., 1 to 25 micron diameter) of silicon nitride and silicon carbide suspended in a colloidal silica or zircon binder. In order to minimize the coating/CMC thermal expansion mismatch, the weight ratio of these materials in the bond coating should match the ratio of these in the CMC substrate 12. If the CMC substrate 12 is SiC fibers in a SiC matrix, the slurry should be composed of SiC particles with a colloidal silica binder. High surface roughness is achieved by entrapping coarse ceramic particles 16 into the wet bond coating slurry. Thereafter the product is heat treated to maximize bond strength and verify oxidation resistance.

High surface roughness is achieved by entrapping coarse (e.g., 125 micron diameter) ceramic particles into the wet bond coat slurry. Particles 16 may be deposited on the slurry coated CMC surface requiring roughening by immersing the CMC into a fluidized bed or by raining particles onto the wet surface. The composition of the coarse particles must be chemically compatible with the slurry coating and the top coating layer 14. Examples of coarse particles that can be entrapped in the slurry are: SiC, silicon nitride, alpha alumina, tantalum oxide, zircon (zirconium silicate), mullite (aluminum silicate), and stabilized zirconia (e.g., yttria). The layer of coarse particles in the bond coating also facilitates grading of the thermal expansion coefficient from the CMC 12 to the insulative/abradable top coating layer(s) 14.

Following deposition of the slurry coating 10, the CMC is dried and heat treated in air in the 800 to 1300 degree Centigrade temperature range (preferably near the maximum use temperature for the CMC) for a few hours to maximize bond strength and verify oxidation resistance.

Following the heat treatment of the slurry bond coating 10, the insulative and abradable top coating layer(s) 14 are applied to the CMC 12. Deposition processes may include plasma spraying (or other suitable thermal spray process) or slurry deposition (with a binder that is compatible with the maximum gas-path surface temperature (e.g., colloidal silica or colloidal alumina). Insulative and abradable top coating layer(s) 14 for SiC-fiber/silicon nitridematrix and SiC-fiber/SiC-matrix composites include: tantalum oxide, mullite, stabilized zirconia, and zircon.

Clearly many modifications and variations of the present invention are possible in light of the above teachings and it is therefore understood, that within the inventive scope of the inventive concept, that the invention may be practiced otherwise than specifically claimed.

What is claimed is:

1. A durable laminate comprising,
   a) a ceramic-substrate or structure,
   b) an abradable outer coating and
   c) a binder layer interposed between said substrate and said outer coating to bond same, said binder layer having fine particles selected from the group consisting of silicon nitride, silicon carbide (SiC) and a combination thereof.

2. The laminate of claim 1 wherein said fine particles are suspended in a colloidal binder of silica or zircon.

3. The laminate of claim 1 wherein said fine particles have diameters ranging from about 1–25 microns.

4. The laminate of claim 1 wherein said binder layer has coarse ceramic particles therein.

5. The binder layer of claim 4 wherein said coarse particles have diameters ranging from 100–150 microns.

6. The laminate of claim 4 wherein said coarse particles are selected from the group consisting of silicon carbide, silicon nitride, alpha alumina, tantalum oxide, zirconium silicate, aluminum silicate and stabilized zirconia.

7. The laminate of claim 4 wherein said coarse ceramic particles have varying weight percentages from said substrate to said outer coating to provide a gradation of expansion coefficient therebetween.

8. The laminate of claim 4 wherein the binder layer with coarse ceramic particles therein begins as a wet slurry and is heat-treated to maximize bond strength and verify oxidation resistance.

9. The laminate of claim 1 wherein said substrate is a ceramic matrix composite (CMC).

10. The laminate of claim 9 wherein the ratio of the materials is said binder layer approximates or matches the weight ratio of the same materials in the CMC substrate.

11. The laminate of claim 10 wherein said CMC has SiC fibers in a SiC matrix and said binder layer has SiC particles in a colloidal silica binder.

12. The laminate of claim 10 wherein when said CMC substrate has silicon nitride and silicon carbide materials therein, the weight ratio thereof is approximated in the formulation of the same materials in said binder layer.

13. The laminate of claim 9 wherein said abradable outer coating has material selected from the group consisting of tantalum oxide, mullite, stabilized zirconia and zircon and said CMC has material selected from the group consisting of SiC-fiber/silicon nitride matrix and SiC-fiber/Si-C matrix.

14. The laminate of claim 1 wherein said substrate or structure is a turbine shroud in a jet engine.

* * * * *